Jan. 16, 1962 A. SCHREIBER 3,017,033
IMPROVED GRID FOR FILLING MATERIAL
Filed Oct. 17, 1956
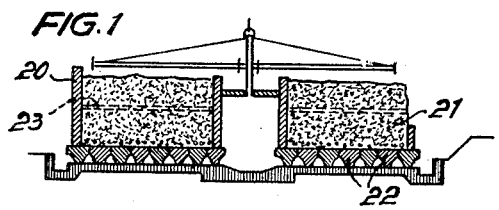
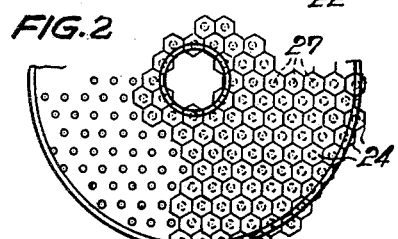
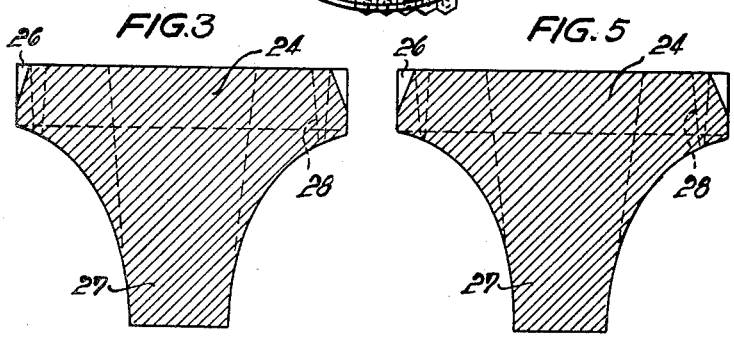
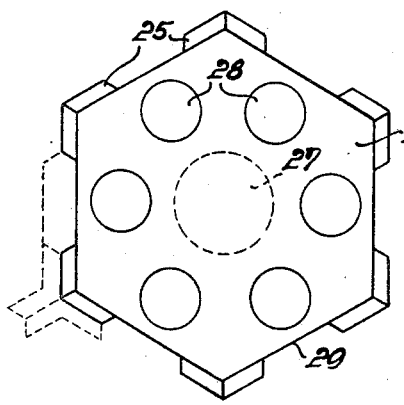
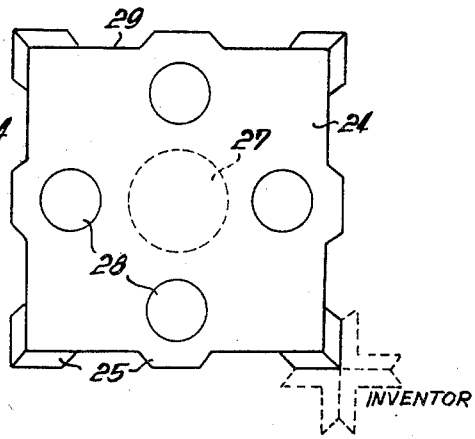
INVENTOR
AUGUST SCHREIBER

3,017,033
IMPROVED GRID FOR FILLING MATERIAL
August Schreiber, 49a Bahnhofstrasse, Hannover-Vinnhorst, Germany
Filed Oct. 17, 1956, Ser. No. 616,406
2 Claims. (Cl. 210—293)

In a sewage treatment plant which operates with biological purification, or if such a system follows a mechanical purification, the tank or trickling filter is provided with a supporting grid for the filling material, the said grid consisting of individual grid plates. It is known to use for this purpose rectangular plates with flow slots and feet at each corner of the plates.

An essential disadvantage of the known grid plates consists in that four feet always meet at the corners of the individual bricks when the grid is assembled, so that the effective grid area is thereby considerably reduced and, hence, the action of the trickling filter is impaired.

In order to eliminate this defect, the grid plates according to the invention comprise a centrally arranged foot tapering towards the bed surface, and the flanks of the grid plates which abut one another are tapered in the manner of bevels. The grid plates are advantageously of angular form, preferably of rectangular or hexagonal form.

The invention will be further described with reference to the accompanying drawings, wherein FIGURES 1 and 2 are a vertical section and a plan view, respectively, of an assembled trickling filter employing one form of grid plate according to the invention;

FIGURES 3 and 4 are a vertical section and a plan view, respectively, of a hexagonal form of grid plate shown in FIGURES 1 and 2, and FIGURES 5 and 6 are a vertical section and a plan view, respectively, of a square grid plate.

In the drawings, the same numerals designate the same or similar parts.

The tank 20 illustrated in FIGURES 1 and 2 accommodates filling material 21 which rests on a supporting grid 22 and into which is fitted an intermediate grid, such as shown at 23. The grid for the filling consists of hexagonal plates (FIGS. 3 and 4) or square plates (FIGS. 5 and 6), these plates 24 only have bearing surfaces 25 in the region of the corners and being bevelled upwardly as shown at 26.

The plates 24 are formed with a foot or base 27 which is arranged centrally and tapers towards the floor surface so that the cross-sections through the plates show a mushroom-like appearance, as shown in FIGS. 3 and 5. The plates 24 are formed with holes 28 for the passage of air and water; the side edges are formed with recesses 29, which serve the same purpose. The cross-section of the plate base 27 is merely sufficiently large to take up the bearing pressures, and otherwise leaves a considerable amount of space for the passage of air and for the purification.

I claim:

1. A grid for supporting filling material in a tank, comprising an assembly of abutting plates each provided with a flat rectilinear upper surface forming the sole support for all of the filling material, and each provided with a single, central, downwardly-tapering foot of solid cross-sectional area bearing against the floor of the tank, whereby a vertical cross-section through the plate shows a mushroom-like appearance, and the cross-section of the foot in contact with the floor surface is materially smaller than the upper flat surface and merely sufficiently large to take up the requisite bearing pressure due to the weight of the filling material on said flat rectilinear upper surface, openings for the passage of fluids in each plate, and projecting, downwardly-directed, bevelled surfaces at the corners of each plate whereby, when the plates are assembled together in abutting relation to form the grid, adjacent plates contact at the corners and additional flow passages are formed between abutting plates.

2. A grid according to claim 1, wherein the plates are of polygonal shape.

References Cited in the file of this patent
UNITED STATES PATENTS

| | | |
|---|---|---|
| 249,868 | Andrew | Nov. 22, 1881 |
| 714,363 | Cleveland | Nov. 25, 1902 |
| 911,314 | Maranville | Feb. 2, 1909 |
| 1,497,141 | Hart | June 10, 1924 |
| 1,544,617 | Wagner | July 1, 1925 |
| 1,601,465 | Barbour | Sept. 28, 1926 |
| 1,783,249 | MacMillen | Dec. 2, 1930 |
| 1,938,215 | Corcoran | Dec. 5, 1933 |
| 1,974,427 | Knight | Sept. 25, 1934 |
| 2,651,318 | Cates | Sept. 8, 1953 |

FOREIGN PATENTS

| | | |
|---|---|---|
| 5,385 | Great Britain | Mar. 5, 1909 |
| 10,035 | Great Britain | 1911 |
| 15,376 | Great Britain | of 1910 |
| 21,133 | Great Britain | 1912 |